(12) United States Patent
Asada et al.

(10) Patent No.: US 8,477,269 B2
(45) Date of Patent: Jul. 2, 2013

(54) LIQUID CRYSTAL DISPLAY DEVICE

(75) Inventors: Satoshi Asada, Ishikawa-ken (JP); Daiichi Suzuki, Ishikawa-ken (JP); Tetsuo Fukami, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 191 days.

(21) Appl. No.: 13/179,028

(22) Filed: Jul. 8, 2011

(65) Prior Publication Data

US 2012/0013830 A1 Jan. 19, 2012

(30) Foreign Application Priority Data

Jul. 15, 2010 (JP) .................................. 2010-160931

(51) Int. Cl.
*G02F 1/1335* (2006.01)

(52) U.S. Cl.
USPC ............. 349/106; 349/84; 349/104; 349/105; 349/107; 349/108

(58) Field of Classification Search
USPC .............. 349/56, 84, 104, 105, 106, 107, 108
See application file for complete search history.

(56) References Cited

U.S. PATENT DOCUMENTS 8,284,355 B2 * 10/2012 Tokuda et al. ................. 349/110
2007/0002258 A1 * 1/2007 Wu ................................ 349/155

FOREIGN PATENT DOCUMENTS

JP 2001-51266 2/2001

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

In one embodiment, a liquid crystal display device includes a first substrate having a first pixel electrode and a first pillar-shaped spacer arranged in an active area, and a second pixel electrode and a second pillar-shaped spacer arranged in a shield area surrounding the active area. A shield layer is formed in the shape of a belt crossing above the first pillar-shaped spacer in the active area and extending to the shield area including a portion above the second pillar-shaped spacer. The height of a first seat layer formed above the first pillar-shaped spacer and including the shield layer, a first color filter layer and an overcoat layer is substantially the same as that of a second seat layer formed above the second pillar-shaped spacer and including the shield layer, a second color filter layer and the overcoat layer.

16 Claims, 6 Drawing Sheets

LIQUID CRYSTAL DISPLAY DEVICE

CROSS-REFERENCE TO RELATED APPLICATION

This application is based upon and claims the benefit of priority from Japanese Patent Application No. P2010-160931, filed Jul. 15, 2010, the entire contents of which are incorporated herein by reference.

FIELD

Embodiments described herein relate generally to a liquid crystal display device.

BACKGROUND

Liquid crystal display devices are widely used as display devices for various kinds of equipments such as personal computers, OA equipments, and TV sets because the liquid crystal display devices have many advantages such as lightness, compactness and low power consumption. In recent years, the liquid crystal display device has also been used in mobile terminal equipments such as a mobile phone, a PAD (personal digital assistant) device, a car navigation device and a game player.

It is required in the liquid crystal display device that a desired cell gap be formed. For example, there is a technology which forms a seat layer made of a trichromatic colored layer and a black matrix for a pillar-shaped resin spacer. More specifically, in an active region of a panel, the colored layer is prepared on the black matrix, and the pillar-shaped resin spacer is formed on the colored layer.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

FIG. 1 is a figure schematically showing a structure of a liquid crystal display device according to one embodiment.

FIG. 2 is a figure schematically showing the structure and an equivalent circuit of the liquid crystal display panel shown in FIG. 1.

FIG. 3 is a figure schematically showing a cross-sectional structure of the liquid crystal display panel shown in FIG. 2.

FIG. 4 is a plan view schematically showing one example of a layout of a shield layer and a color filter layer arranged in an active area and a shield area.

FIG. 5 is a cross-sectional figure schematically showing the liquid crystal display panel including a first pillar-shaped spacer taken along line A-B shown in FIG. 4.

FIG. 6 is a cross-sectional figure schematically showing the liquid crystal display panel including a second pillar-shaped spacer taken along line C-D shown in FIG. 4.

FIG. 7 is a cross-sectional figure schematically showing the active area of the liquid crystal display panel taken along line E-F shown in FIG. 4 according to other embodiment.

DETAILED DESCRIPTION OF THE INVENTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device includes: a first substrate including a first pixel electrode and a first pillar-shaped spacer arranged in an active area, and a second pixel electrode and a second pillar-shaped spacer arranged in a shield area surrounding the active area; a second substrate including; a shield layer formed in the shape of a belt crossing above the first pillar-shaped spacer in the active area and extending to the shield area including a portion above the second pillar-shaped spacer, a first color filter layer crossing with the shield layer above the first pillar-shaped spacer, a second color filter layer formed in the shape of a belt formed on the shield layer above the second pillar-shaped spacer, an overcoat layer extending in the active area including a portion above the first pillar-shaped spacer and in the shield layer including a portion above the second pillar-shaped spacer, and a counter electrode formed on the overcoat layer and facing the first and second pixel electrodes, a liquid crystal layer held between the first and second substrates, wherein the height of a first seat layer formed above the first pillar-shaped spacer and including the shield layer, the first color filter layer and the overcoat layer is substantially the same as that of a second seat layer formed above the second pillar-shaped spacer and including the shield layer, the second color filter layer and the overcoat layer.

FIG. 1 is a figure schematically showing the structure of the liquid crystal display device according to one embodiment. The liquid crystal display device 1 is an active-matrix type liquid crystal display device, and is equipped with an approximately rectangular liquid crystal display panel LPN, a driver IC chip 2 and a flexible wiring substrate 3, etc. connected to the liquid crystal display panel LPN.

The liquid crystal display panel LPN includes an array substrate (first substrate) AR, a counter substrate (second substrate) CT which opposes the array substrate AR, and a liquid crystal layer LQ held between the array substrate AR and the counter substrate CT. The array substrate AR and the counter substrate CT are pasted together by a seal material SE.

The liquid crystal display panel LPN includes an area ACT, i.e., an active area to display an image in an inner side surrounded by the seal material SE. The active area ACT is formed in a rectangular shape, for example, and is constituted by a plurality of pixels PX arranged in the shape of a matrix of (m×n). Here, "m" and "n" are respectively positive integers.

Moreover, the liquid crystal display panel LPN is equipped with a shied area SLD between the seal material SE and the active area ACT. The shied area SLD is area which does not contribute to the display, and is formed in the shape of a rectangular frame so as to surround the active area ACT. The shied area SLD is constituted by a plurality of dummy pixels DP. The structure of the dummy pixel DP will be mentioned later for details, although it is substantially the same as the pixel PX.

The driver IC chip 2 and the flexible wiring substrate 3 are mounted on the array substrate AR in the outside of the active area ACT, and function as a signal source for supplying signals required for the drive of the pixel PX and the dummy pixel DP.

FIG. 2 is a figure schematically showing the structure and the equivalent circuit of the liquid crystal display panel LPN shown in FIG. 1. The liquid crystal display panel LPN is equipped with a plurality of gate lines G, auxiliary capacitance lines C, and source lines S, etc. The gate lines G and the auxiliary capacitance lines C extend in a first direction X, respectively. The source lines S extend in a second direction

Figure 1:
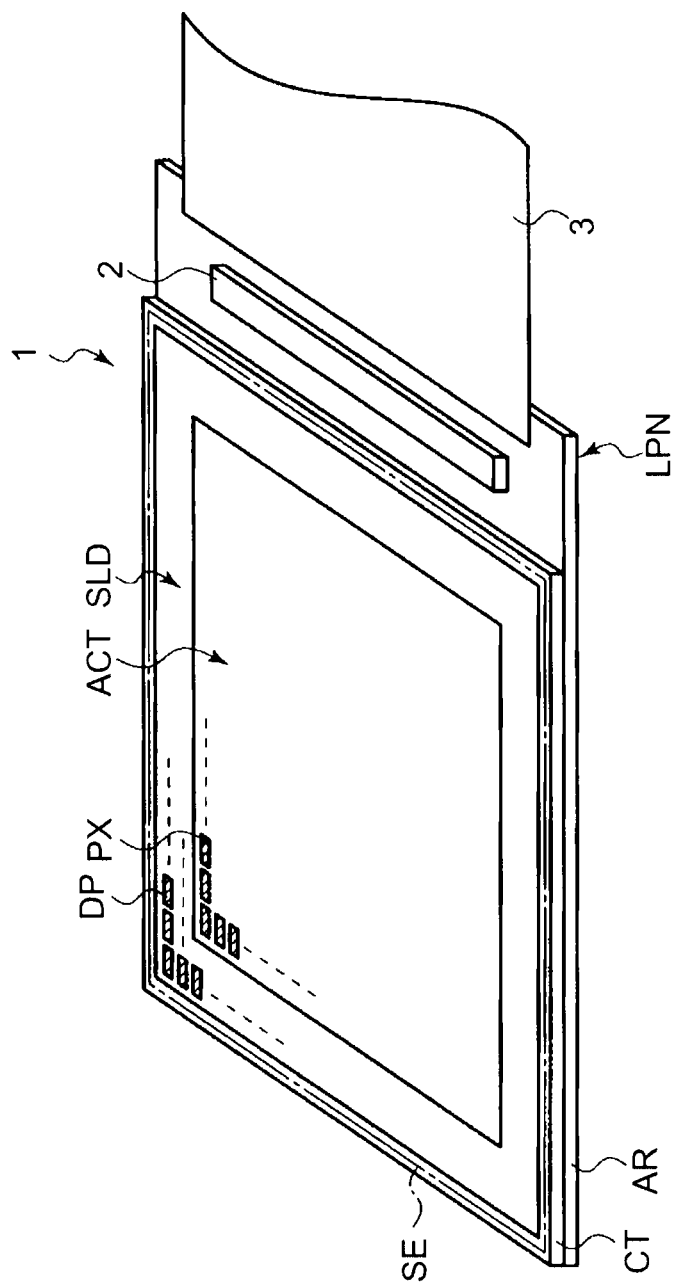

Y that orthogonally intersects with the gate line G and the auxiliary capacitance line C. In the active area ACT, "n" gate lines G, "n" auxiliary capacitance lines C, and "m" source lines S are arranged corresponding to (m×n) pixels PX. In the shield area SLD, each number of the gate lines G, the auxiliary capacitance lines C, and the source lines S corresponds to an arrangement of the dummy pixels DP.

Each gate line G arranged in the active area ACT and the shied area SLD is connected to a gate driver GD. Similarly, each source line S arranged in the active area ACT and the shied area SLD is connected to a source driver SD. The gate driver GD and the source driver SD are formed on the array substrate AR, and are connected with the driver IC chip 2 equipped with a controller, for example. In addition, the gate driver GD and the source driver SD may be built in the driver IC chip 2. The driver IC chip 2 is mounted on the array substrate AR extending to the outside of the counter substrate CT.

Each pixel PX and each dummy pixel DP are respectively equipped with a switching element SW, a pixel electrode PE, a counter electrode CE, etc. Retention capacitance Cs is formed between the auxiliary capacitance line C and the pixel electrode PE, for example.

In this embodiment, the liquid crystal display panel LPN adopts an OCB (Optically Compensated Bend) mode, in which the pixel electrode PE is formed on the array substrate AR, and the counter electrode CE is formed on the counter substrate CT. Further, a liquid crystal molecule which constitutes the liquid crystal layer LQ is driven by a vertical electric field (namely, substantially vertical electric field with respect to the principal surfaces of the substrates) formed between the pixel electrode PE and the counter electrode CE.

The switching element SW is constituted by an n channel-type thin film transistor (TFT), for example. The switching element SW is electrically connected with the gate line G and the source line S. The (m×n) switching elements SW are formed in the active area ACT. Also in the shied area SLD, a plurality of switching elements SW is formed.

The pixel electrode PE is electrically connected with the switching element SW. In this embodiment, in order to distinguish the pixel electrode PE arranged in each pixel PX from the pixel electrode PE arranged in the dummy pixel DP, the former pixel electrode PE and the latter pixel electrode PE are called a first pixel electrode PE1 and a second pixel electrode PE2, respectively.

The first (m×n) pixel electrodes PE1 are formed in the active area ACT. Similarly, a plurality of second pixel electrodes PE2 is formed in the shied area SLD. The counter electrode CE is set to a common potential and extends in the active area ACT and the shied area SLD. The counter electrode CE faces each other the first pixel electrode PE1 arranged in the active area ACT and the second pixel electrode PE2 arranged in the shied area SLD through the liquid crystal layer LQ. The counter electrode CE is electrically connected with an electric supply portion 10 formed in the array substrate AR through an electric conductive component which is not illustrated. The auxiliary capacitance line C is electrically connected with a voltage impression portion VCS to which an auxiliary capacitance voltage is impressed.

Figure 2:
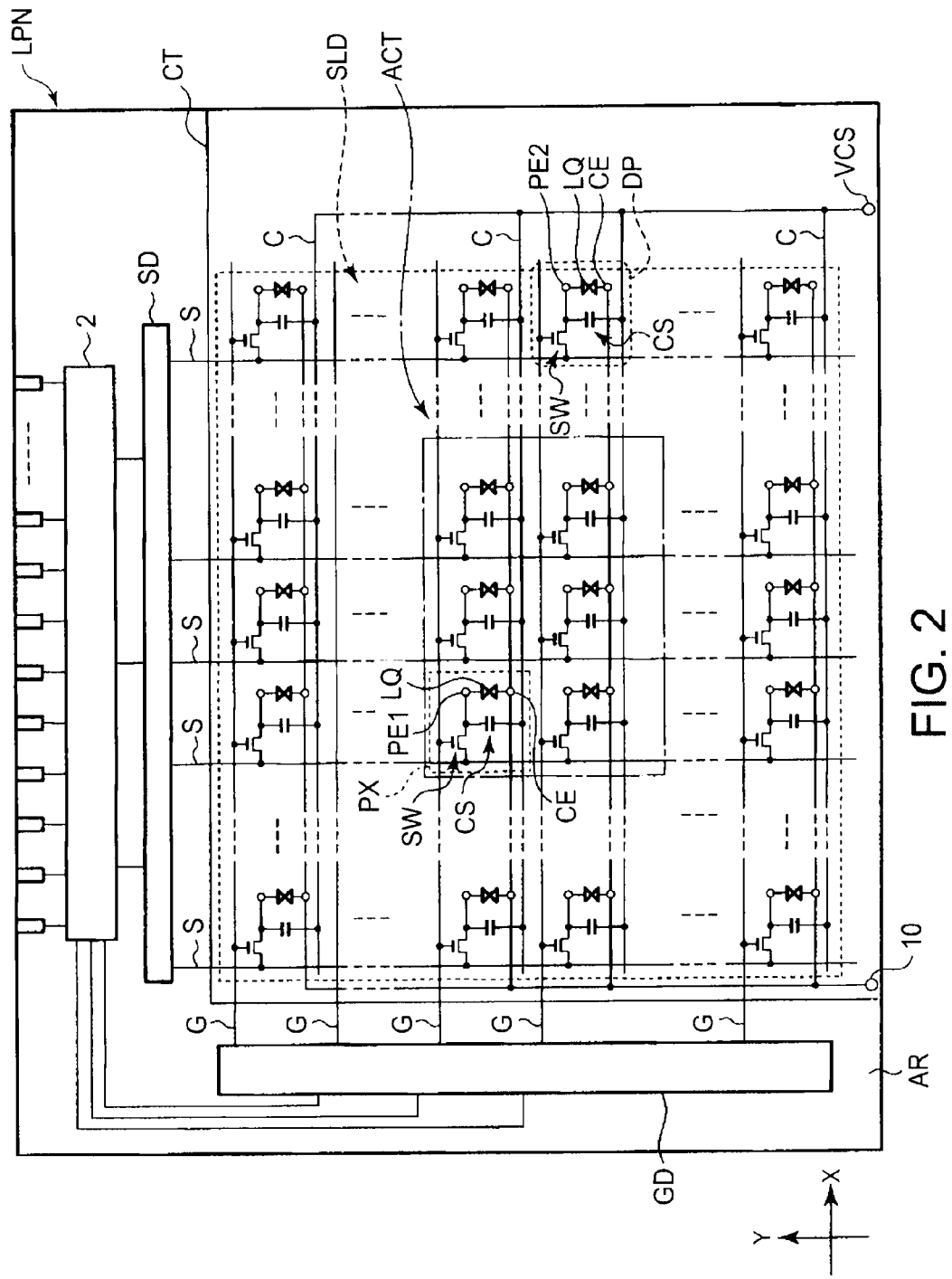
Figure 3:
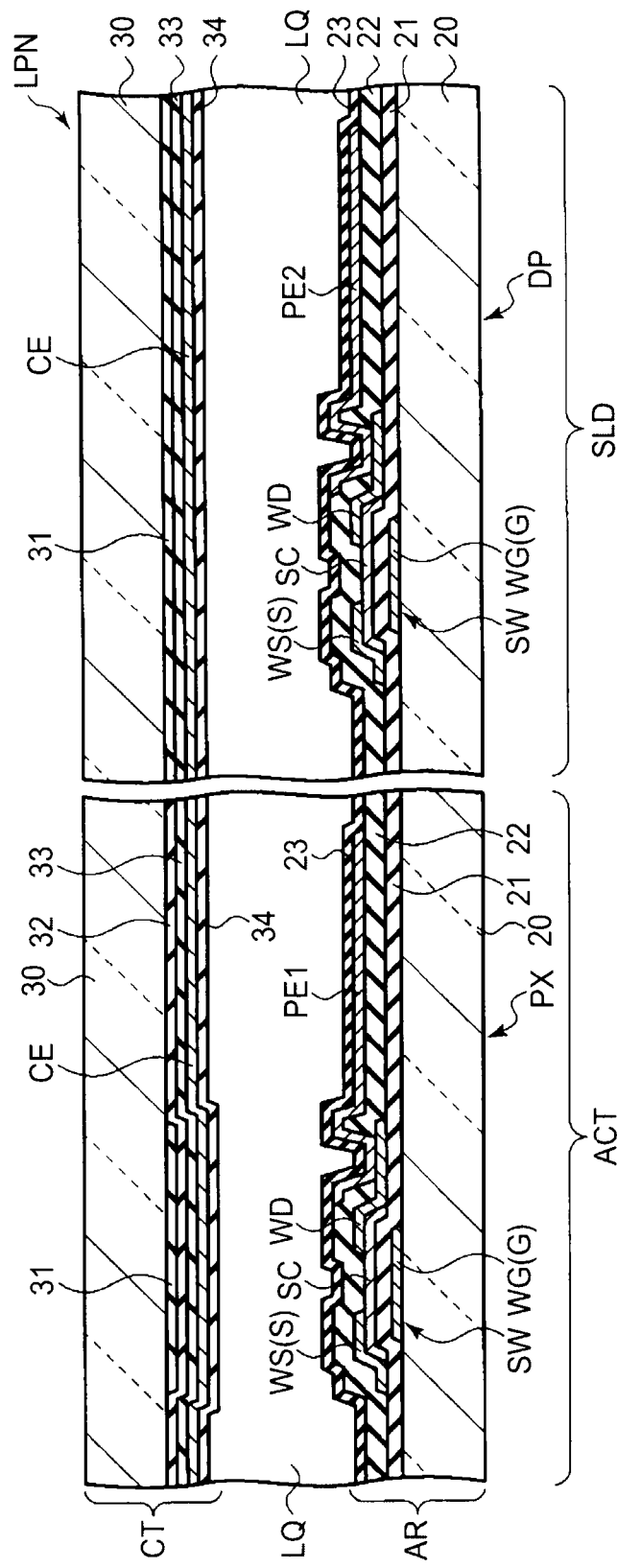

FIG. 3 is a figure schematically showing a cross-sectional structure of the liquid crystal display panel LPN shown in FIG. 2. In FIG. 3, the cross-sectional views of the pixel PX in the active area ACT and the dummy pixel DP in the shied area SLD are illustrated.

The array substrate AR is formed using a first light transmissive insulating substrate 20, such as a glass substrate, etc. The array substrate AR includes the switching element SW, the first pixel electrode PE1, and the second pixel electrode PE2 on the first insulating substrate 20. Although the switching element SW shown here is formed with a thin film transistor of a bottom gated type and includes a semiconductor layer SC formed of amorphous silicon, the structure of the switching element SW is not limited to this example. For example, the switching element SW may be a thin film transistor of a top gated type, or include the semiconductor layer SC formed of poly-silicon.

The switching elements SW are arranged in each pixel PX of the active area ACT and in each dummy pixel DP of the shied area SLD, respectively. A gate electrode WG of the switching element SW is formed on the first insulating substrate 20. The gate electrode WG is electrically connected with the gate line G. In the illustrated example, the gate electrode WG is integrally formed with the gate line G. The gate electrode WG is covered with a first interlayer insulating film 21. The first interlayer insulating film 21 extends in the active area ACT and the shied area SLD, and is also arranged on the first insulating substrate 20. In addition, although not illustrated, the auxiliary capacitance line C is formed on the first insulating substrate 20 like the gate electrode WG or the gate line G, and is covered with the first interlayer insulating film 21.

The semiconductor layer SC of the switching element SW is formed on the first interlayer insulating film 21. The semiconductor layer SC is located right above the gate electrode WG. The source electrode WS and the drain electrode WD of the switching element SW are formed on the first interlayer insulating film 21, and respective portions of the source electrode WS and the drain electrode WD are in contact with the semiconductor layer SC.

A source electrode WS is electrically connected with the source line S. In the illustrated example, the source electrode WS is integrally formed with the source line S. The source electrode WS and the drain electrode WD are covered with a second interlayer insulating film 22. The second interlayer insulating film 22 extends in the active area ACT and the shied area SLD, and is also arranged on the first interlayer insulating film 21. The first interlayer insulating film 21 and the second interlayer insulating film 22 are formed of an inorganic system material and various resin materials, such as a silicon nitride (SiN).

The first pixel electrode PE1 is formed on the second interlayer insulating film 22 in the active area ACT. This first pixel electrode PE1 is connected with the drain electrode WD through a contact hole which penetrates the second interlayer insulating film 22. The second pixel electrode PE2 is formed on the second interlayer insulating film 22 in the shied area SLD. The second pixel electrode PE2 is connected with the drain electrode WD through a contact hole which penetrates the second interlayer insulating film 22.

The first pixel electrode PE1 and the second pixel electrode PE2 are formed of transparent oxide electric conductive materials, such as Indium Tin Oxide (ITO) and Indium Zinc Oxide (IZO). The first pixel electrode PE1, the second pixel electrode PE2, and the second interlayer insulating film 22 are covered with a first alignment film 23.

On the other hand, the counter substrate CT is formed using a light transmissive second insulating substrate 30, such as a glass substrate etc. The counter substrate CT is equipped with a shield layer 31, a color filter layer 32, an overcoat layer 33, and the counter electrode CE, etc. on the second insulating substrate 30 (inside surface opposing the array substrate AR) in the active area ACT.

The shield layer 31 is formed in the inside surface of the second insulating substrate 30. The shield layer 31 is arranged between adjacent pixels PX in the active area ACT and opposes the switching element SW and various wirings formed in the array substrate AR, such as the gate line G, the source line S as mentioned-above, etc. Moreover, the shield layer 31 extends to the shied area SLD and is arranged in the dummy pixel DP. That is, the shield layer 31 opposes not only the various wirings but the second pixel electrode PE2 in the shied area SLD. The shield layer 31 can be formed by black colored resin materials or metal materials having a light blocking effect, such as chromium (Cr), etc.

The color filter layer 32 is formed in the inside surface of the second insulating substrate 30, and a portion of the color filter layer 32 is laminated on the shield layer 31. The color filter layer 32 is arranged in each pixel PX in the active area ACT so as to oppose the first pixel electrode PE1 formed in the array substrate AR. In addition, although illustration is omitted here, the color filter layer 32 consists of colored layers by three primary colors, i.e., a red color filter layer colored in red, a green color filter layer colored in green, and a blue color filter layer colored in blue.

The overcoat layer 33 extends all over the surface in the active area ACT and the shied area SLD. That is, the overcoat layer 33 is formed on the color filter layer 32 in the active area ACT. In addition, the overcoat layer 33 is also formed on the shield layer 31 between the adjacent color filter layers 32. The overcoat layer 33 is arranged right above the first pixel electrode PE1 and various wirings formed on the array substrate AR in the active area ACT. Moreover, the overcoat layer 33 is formed on the shield layer 31 in the shied area SLD. That is, the overcoat layer 33 is arranged also right above the second pixel electrode PE2 formed in the array substrate AR and the various wirings in the shied area SLD. The overcoat layer 33 is formed of a transparent resin material, for example.

The counter electrode CE extends all over the surface in the active area ACT and the shied area SLD. That is, the counter electrode CE is formed on the overcoat layer 33 in the active area ACT and the shied area SLD. The counter electrode CE opposes the first pixel electrode PE1 of each pixel PX in the active area ACT. Moreover, the counter electrode CE opposes the second pixel electrode PE2 of each dummy pixel DP in the shied area SLD. The counter electrode CE is formed of transparent electric conductive oxide materials, such as ITO and IZO. The counter electrode CE is covered with a second alignment film 34.

The array substrate AR and the counter substrate CT as mentioned-above are arranged so that the first alignment film 23 may counter the second alignment film 34. At this time, between the first alignment film 23 of the array substrate AR and the second alignment film 34 of the counter substrate CT, a spacer (pillar-shaped spacer formed integrally in the array substrate AR which will be explained later) is arranged, and thereby, a predetermined cell gap is formed.

The liquid crystal layer LQ is formed in the cell gap as mentioned-above. That is, the liquid crystal layer LQ is constituted by liquid crystal composites held between the pixel electrodes PE (first pixel electrode PE1 and second pixel electrode PE2) of the array substrate AR and the counter electrode CE of the counter substrate CT. In an initial stage when an electric field is not formed between the pixel electrode PE and the counter electrode CE, the liquid crystal molecules of the liquid crystal layer LQ are aligned in a splay alignment state. Where the voltage more than threshold voltage value is impressed between the pixel electrode PE and the counter electrode CE, the liquid crystal molecules are transited to a bend alignment state from the splay alignment state. Where further higher voltage is impressed between the pixel electrode PE and the counter electrode CE, most of the liquid crystal molecules are aligned in the electric field direction.

In addition, although not illustrated in FIG. 3, polarizing plates are respectively arranged on an external surface of the first insulating substrate 20 and an external surface of the second insulating substrate 30. Further, a retardation film is arranged at one of the external surfaces of the first insulating substrate 20 and the external surface of the second insulating substrate 30 in addition to the polarizing plate. With the drive of the liquid crystal molecules according to the electric field between the above pixel electrode PE and the counter electrode CE, a retardation in the liquid crystal layer LQ changes. The light which passed the liquid crystal display panel LPN alternatively penetrates the polarizing plate on the second insulating substrate 30 side, and an image is displayed on the active area ACT. In the shied area SLD, although the liquid crystal molecules are driven like in the active area ACT, the liquid crystal molecules do not contribute to the display because the shield layer 31 is arranged.

In the liquid crystal display device in the OCB mode as mentioned-above, impurities or ions contained in the liquid crystal layer LQ move toward a circumference of the active area ACT with the drive of the liquid crystal molecules, and there is a possibility that the impurities or ions may be locally distributed in the circumference of the active area ACT. Unlike other regions, the region in which such impurities, etc. are locally distributed, may be sighted as a display unevenness, such as white unevenness.

Therefore, in the liquid crystal display device in the OCB mode according to this embodiment, the shied area SLD of the outside of the active area ACT is equipped with the dummy pixel DP having the same structure as the pixel PX in the active area ACT and absorbs the impurities, etc. which cause the display unevenness. Thereby, although the region in which impurities, etc. are locally distributed is formed in the shied area SLD which does not contribute to the display, but is not formed in the active area ACT. Accordingly, the generation of the display unevenness resulting from the impurities, etc. can be controlled.

On the other hand, in the liquid crystal display device in the OCB mode, the control of the retardation in the liquid crystal layer LQ is very important, and the cell gap which affects the retardation needs to be set with sufficient accuracy. Also in the shied area SLD which does not contribute to the display, the accuracy of the cell gap is important. That is, since the shied area SLD is formed in the circumference of the active area ACT, when the cell gap of the shied area SLD shifts from a desired value, there is a possibility of affecting the cell gap of the circumference portion of the active area ACT close to the shied area SLD.

For example, though the cell gap of the active area ACT is formed with a predetermined value, when the cell gap of the shied area SLD becomes smaller than the predetermined value, the circumference of the active area ACT close to the shied area SLD is affected by the cell gap of the shied area SLD. Accordingly, the cell gap may become smaller than the predetermined value. In this case, in the circumference portion of the active area ACT, the gap shift may be sighted as display unevenness unlike a central portion of the active area ACT.

Figure 4:
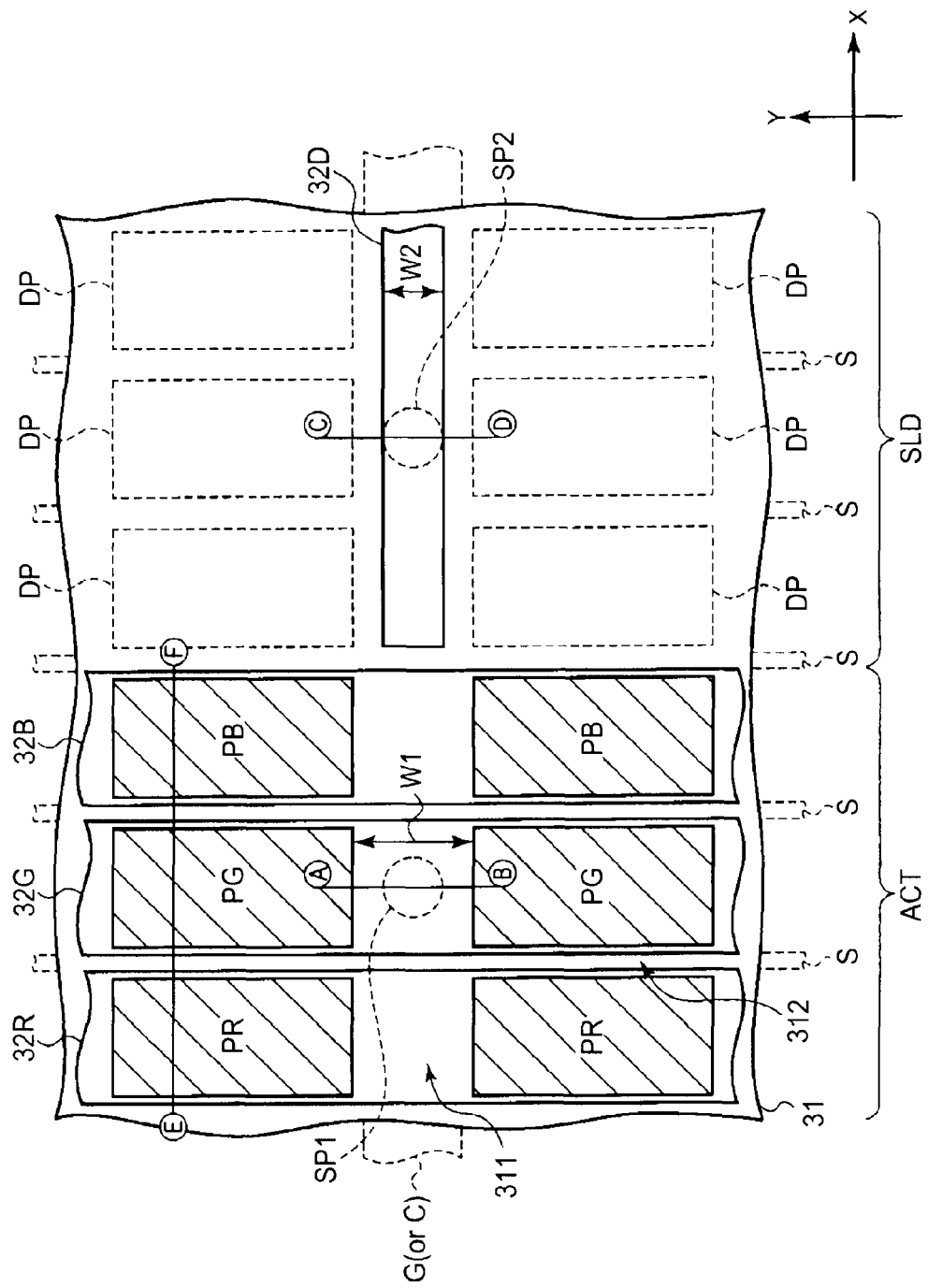

Then, in this embodiment, the cell gap is constituted so that a predetermined cell gap may be formed also in the shied area SLD. Hereafter, the structure will be explained in detail. FIG. 4 is a top view schematically showing a layout of the shield layer 31 and the color filter layer 32 arranged in the active area ACT and the shied area SLD. First, the structure of the active area ACT is explained.

The shield layer 31 is formed in the shape of a lattice, and forms the black matrix. The shield layer 31 includes a first belt-like portion 311 extending linearly in the first direction X and a second belt-like portion 312 extending linearly in the second direction Y. The first belt-like portion 311 having a first width W1 is formed more broadly than the second belt-like portion 312.

The first belt-like portion 311 is located right above the gate line G and the auxiliary capacitance line C formed in the array substrate side. Further, the first belt-like portion 311 is arranged so as to cross a first pillar-shaped spacer SP1 formed in the active area ACT of the array substrate AR. The second belt-like portion 312 is located right above the source line S formed in the array substrate.

The first belt-like portion 311 and the second belt-like portion 312 cross mutually and form the lattice. Approximately rectangular openings PR, PG, and PB are formed in the shield layer 31. The openings PR, PG, and PB are regions which substantially contribute to the display. In the illustrated example, the three openings PR, PG, and PB in the active area ACT are arranged in a line in the first direction X. Here, for example, the opening PR corresponds to the red pixel which displays red color, opening PG corresponds to the green pixel which displays green color, and the opening PB corresponds to the blue pixel which displays blue color. The openings PR, PG, and PB respectively oppose the first pixel electrodes PE1 connected with the switching elements SW on the array substrate.

The second belt-like portions 312 are located between the opening PR and the opening PG, and between the opening PG and the openings PB, respectively. The plurality of openings PR is located in a line in the second direction Y. Similarly, the plurality of openings PG is located in a line in the second direction Y, and the plurality of openings PB is located in a line in the second direction Y. The first belt-like portion 311 is located between the adjacent openings PR located in a line in the second direction Y. Similarly, the first belt-like portion 311 is located between the adjacent openings PG located in a line in the second direction Y, and between the adjacent openings PB located in a line in the second direction Y, respectively. The first pillar-shaped spacer SP1 is located between the adjacent openings PG located in a line in the second direction Y.

As described-above, the color filter layer consists of the red color filter layer 32R (third color filter layer) arranged corresponding to a red pixel, the green color filter layer 32G (first color filter layer) arranged corresponding to a green pixel, and the blue color filter layer 32B (fourth color filter layer) arranged corresponding to a blue pixel.

The red color filter layer 32R is formed in the shape of a belt extending linearly in the second direction Y. The red color filter layer 32R intersects with the shield layer 31 while covering each of the openings PR formed in the shield layer 31. That is, the red color filter layer 32R is arranged at each of the openings PR located in a line in the second direction Y. Furthermore, the red color filter layer 32R overlaps with the first belt-like portion 311 located between the adjacent openings PR in a line in the second direction Y.

The green color filter layer 32G is formed in the shape of a belt extending linearly in the second direction Y. In the illustrated example, although the green color filter layer 32G is arranged apart from the red color filter layer 32R, the green color filter layer 32G may be in contact with the red color filter layer 32R, or the portion of the green color filter layer 32G may overlap with the red color filter layer 32R.

The green color filter layer 32G intersects with the shield layer 31 while covering each of openings PG formed in the shield layer 31. That is, the green color filter layer 32G is arranged at each of the openings PG located in a line in the second direction Y. Moreover, the green color filter layer 32G overlaps with the first belt-like portion 311 located between the adjacent openings PG located in a line in the second direction Y. That is, the green color filter layer 32G intersects with the first belt-like portion 311 right above the first pillar-shaped spacer SP1.

The blue color filter layer 32B is formed in the shape of a belt extending linearly in the second direction Y. In the illustrated example, although the blue color filter layer 32B is arranged apart from the green color filter layer 32G, the blue color filter layer 32B may be in contact with the green color filter layer 32G, or a portion of the blue color filter layer 32B may overlap with the green color filter layer 32G.

The blue color filter layer 32B intersects with the shield layer 31 while covering each of the openings PB formed in the shield layer 31. That is, the blue color filter layer 32B is arranged at each of the openings PB located in a line in the second direction Y. Moreover, the blue color filter layer 32B overlaps with the first belt-like portion 311 located between the adjacent openings PB arranged in a line in the second direction.

Next, the structure of the shied area SLD is explained. The shield layer 31 covers all over the surface in the shied area SLD. That is, the shield layer 31 is a continuation film, and the opening is not formed in the shield layer 31. Therefore, the shield layer 31 is arranged also in the dummy pixel DP (shown by a broken line for convenience) while the shield layer 31 is located right above the gate line G, the auxiliary capacitance line C, and the source line S. The dummy pixel DP is a region corresponding to the second pixel electrode PE2 connected to the switching element SW in the array substrate.

A dummy color filter layer (second color filter layer) 32D is formed in the shape of a belt extending linearly in the first direction X. The dummy color filter layer 32D overlaps with the shield layer 31. The dummy color filter layer 32D is located right above the gate line G and the auxiliary capacitance line C formed in the array substrate. Moreover, the dummy color filter layer 32D is formed in the shied area SLD of the array substrate so that the dummy color filter layer 32D may cross a second pillar-shaped spacer SP2. The second pillar-shaped spacer SP2 is located between the adjacent dummy pixels DP located in a line in the second direction Y.

The dummy color filter layer 32D has a second width of W2. The first width W1 of the first belt-like portion 311 which intersects with the green color filter layer 32G is larger than the second width W2 of the dummy color filter layer 32D.

The dummy color filter layer 32D is formed of the same material as the green color filter layer 32G, for example. For this reason, the dummy color filter layer 32D can be formed at the same process as the green color filter layer 32G.

Figure 5:
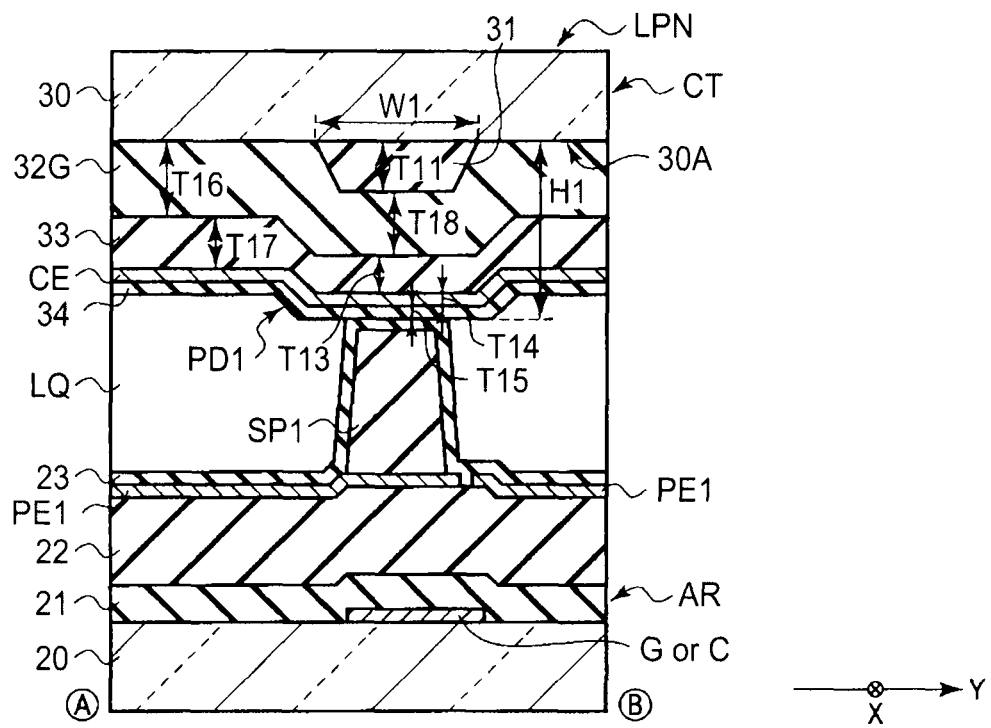

FIG. 5 is a figure schematically showing the liquid crystal display panel LPN taken along line A-B including the first pillar-shaped spacer SP1 in FIG. 4. The array substrate AR is equipped with the first pillar-shaped spacer SP1. The first pillar-shaped spacer SP1 is located right above the gate line G and the auxiliary capacitance line C. In the illustrated example, although the first pillar-shaped spacer SP1 is formed on the first pixel electrode PE1, the first pillar-shaped spacer SP1 may be formed on the second interlayer insulating film 22. The first pillar-shaped spacer SP1 is covered with a first alignment film 23 with the first pixel electrode PE1. The first pillar-shaped spacer SP1 is formed of resin material, for example.

The counter substrate CT includes a first seat layer PD1 formed right above the first pillar-shaped spacer SP1. The first seat layer PD1 is constituted by a plurality of laminated layers, which at least include the first belt-like portion 311 of the shield layer 31, the green color filter layer (the first color filter layer) 32G, and the overcoat layer 33.

Namely, in the counter substrate CT, the first belt-like portion 311 having the first width W1 is located right above the first pillar-shaped spacer SP1. The first belt-like portion 311 is formed on the inside surface 30A of the second insulating substrate 30. The green color filter layer 32G is formed in the inside surface 30A of the second insulating substrate 30 so as to intersect with the first belt-like portion 311, and is stacked on the first belt-like portion 311 right above the first pillar-shaped spacer SP1.

The overcoat layer 33 is formed on the green color filter layer 32G. The overcoat layer 33 is laminated on the green color filter layer 32G right above the first pillar-shaped spacer SP1. The counter electrode CE is formed on the overcoat layer 33 right above the first pillar-shaped spacer SP1. Similarly, the second alignment film 34 is formed on the counter electrode CE right above the first pillar-shaped spacer SP1.

In the illustrated example, the first seat layer PD1 is formed of laminated layers of the first belt-like portion 311 of the shield layer 31, the green color filter layer 32G, the overcoat layer 33, the counter electrode CE, and the second alignment film 34. The first seat layer PD1 has a first height of H1 from the inside surface 30A of the second insulating substrate 30. Namely, the first height H1 is a sum of a film thickness T11 of the first belt-like portion 311 of the shield layer 31, a film thickness T18 of the green color filter layer 32G on the first belt-like portion 311, a film thickness T13 of the overcoat layer 33 on the green color filter layer 32G, a film thickness T14 of the counter electrode CE on the overcoat layer 33, and a thickness T15 of the second alignment film 34 on the counter electrode CE.

In addition, the green color filter layer 32G and the overcoat layer 33 are formed of resin material. For this reason, the resin material in a stepped portion tends to be leveled during the manufacturing process of the green color filter layer 32G and the overcoat layer 33. Therefore, the film thickness T16 between the inside surface 30A of the second insulating substrate 30 and the overcoat layer 33 tends to become thicker than the film thickness T18 between the first belt-like portion 311 of the shield layer 31 and the overcoat layer 33 above the first pillar-shaped spacer. Similarly, with respect to the overcoat layer 33, the film thickness T17 of a portion which overlaps with the green color filter layer 32G formed in the inside surface 30A of the second insulating substrate 30 tends to become thicker than the film thickness T13 of the portion between the green color filter layer 32G and the counter electrode CE above the first pillar-shaped spacer SP1.

Figure 6:
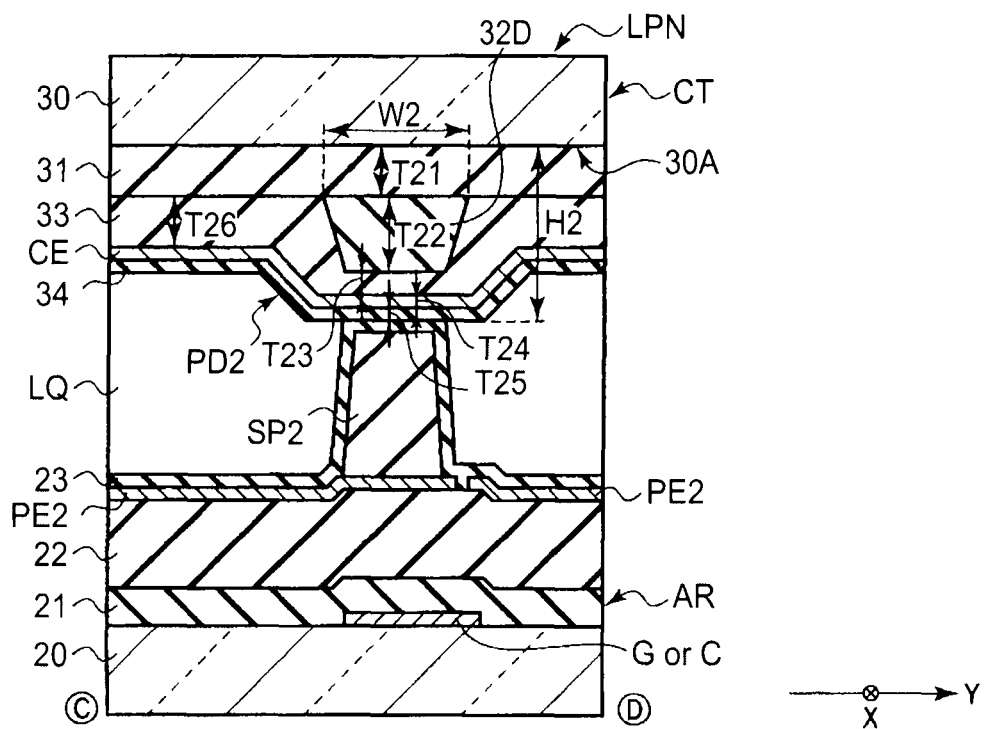

FIG. 6 is a cross-sectional figure schematically showing the liquid crystal display panel LPN taken along line C-D including the second pillar-shaped spacer SP2 shown in FIG. 4.

The second pillar-shaped spacer SP2 is provided on the array substrate AR like the first pillar-shaped spacer SP1. The second pillar-shaped spacer SP2 is located right above the gate line G and the auxiliary capacitance line C. In the illustrated example, although the second pillar-shaped spacer SP2 is formed on the second pixel electrode PE2, the second pillar-shaped spacer SP2 may be formed on the second interlayer insulating film 22. The second pillar-shaped spacer SP2 is covered with the first alignment film 23 with the second pixel electrode PE2. The second pillar-shaped spacer SP2 is formed of resin material, for example, and is formed of the same material as the first pillar-shaped spacer. Accordingly, it is possible to simultaneously form the second pillar-shaped spacer SP2 and the first pillar-shaped spacer SP1 using the same process.

The height from the upper surface of the first insulating substrate 20 to the first alignment film 23 that covers the first pillar-shaped spacer SP1 is substantially the same as the height from the upper surface of the first insulating substrate 20 to the first alignment film 23 that covers the second pillar-shaped spacer SP2.

The counter substrate CT includes a second seat layer PD2 formed right above the second pillar-shaped spacer SP2. The second seat layer PD2 has a second height H2 substantially the same as the first height H1 of the first seat layer PD1. The second seat layer PD2 is constituted by a plurality of laminated layers, such as the shield layer 31, the dummy color filter layer (the second color filter layer) 32D, and the overcoat layer 33.

The shield layer 31 is formed on the inside surface 30A of the second insulating substrate 30 of the counter substrate CT. The shield layer 31 is also located right above the second pillar-shaped spacer SP2. A second dummy color filter layer 32D having a width of W2 is formed on the shield layer 31 right above the second pillar-shaped spacer SP2.

While the overcoat layer 33 is formed on the shield layer 31, the overcoat layer 33 is stacked on the dummy color filter layer 32D right above the second pillar-shaped spacer SP2. The counter electrode CE is formed on the overcoat layer 33, and is stacked right above second pillar-shaped spacer SP2. The second alignment film 34 is formed on the counter electrode CE, and is stacked right above second pillar-shaped spacer SP2.

In the illustrated example, the second seat layer PD2 is formed of the shield layer 31, the dummy color filter layer 32D, the overcoat layer 33, the counter electrode CE, and the second alignment film 34. In this second seat layer PD2, a second height H2 from the inside surface 30A of the second insulating substrate 30 corresponds to a sum of a film thickness T21 of the shield layer 31, a film thickness T22 of the dummy color filter layer 32D on the shield layer 31, a film thickness T23 of the overcoat layer 33 on the dummy color filter layer 32D, a film thickness T24 of the counter electrode CE on the overcoat layer 33, and a thickness T25 of the second alignment film 34.

The film thickness T21 of the shield layer 31 is substantially the same as the film thickness T11 of the first belt-like portion 311 of the shield layer 31. Moreover, the film thickness T24 of the counter electrode CE is substantially the same as the film thickness T14. Moreover, the film thickness T25 of the second alignment film 34 is the same as the film thickness T15 of the first alignment film 23.

Since, the dummy color filter layer 32D is formed on the shield layer 31 which is flat, the leveling is hardly carried out. The film thickness T22 is thicker than the film thickness T18 of the green color filter layer 32G on the first belt-like portion 311 in FIG. 5. In addition, the film thickness T22 of the dummy color filter layer 32D is substantially the same as the film thickness T16 of the green color filter layer 32G.

With respect to the overcoat layer 33, the leveling is carried out on the dummy color filter layer 32D. The film thickness T26 of a portion which overlaps with the shield layer 31 tends to become thicker rather than the film thickness T23 of a portion between the dummy color filter layer 32D and the counter electrode CE right above the second pillar-shaped spacer SP2. Moreover, with respect to the overcoat layer 33, since the second width W2 of the dummy color filter layer 32D is smaller than the first width W1 of the first belt-like portion 311 of the shield layer 31, the film thickness T13 of the portion between the green color filter layer 32G and the counter electrode CE right above the first pillar-shaped spacer SP1 is larger than the film thickness T23 of a portion between the second pillar-shaped spacer SP2 and the counter electrode CE.

According to the above structure, in the active area ACT, the first pillar-shaped spacer SP1 formed in the array substrate side is supported by the first seat layer PD1 formed in the counter substrate CT. On the other hand, in the shied area SLD, the second pillar-shaped spacer SP2 formed in the array substrate side is supported by the second seat layer PD2 formed in the counter substrate side.

At this time, since the first height H1 of the first seat layer PD1 is substantially the same as the second height H2 of the second seat layer PD2, the cell gap of the active area ACT formed of the first pillar-shaped spacer SP1 and the first seat layer PD1 becomes substantially the same as the cell gap of the shied area SLD formed of the second pillar-shaped spacer SP2 and the second seat layer PD2.

Thus, in the shied area SLD, since a predetermined cell gap can be formed, it becomes possible to form the predetermined cell gap also in the circumference portion of the active area ACT close to the shied area SLD. Therefore, in the whole active area ACT, the generation of display unevenness can be controlled, and a high quality liquid crystal display device can be offered.

Figure 7:
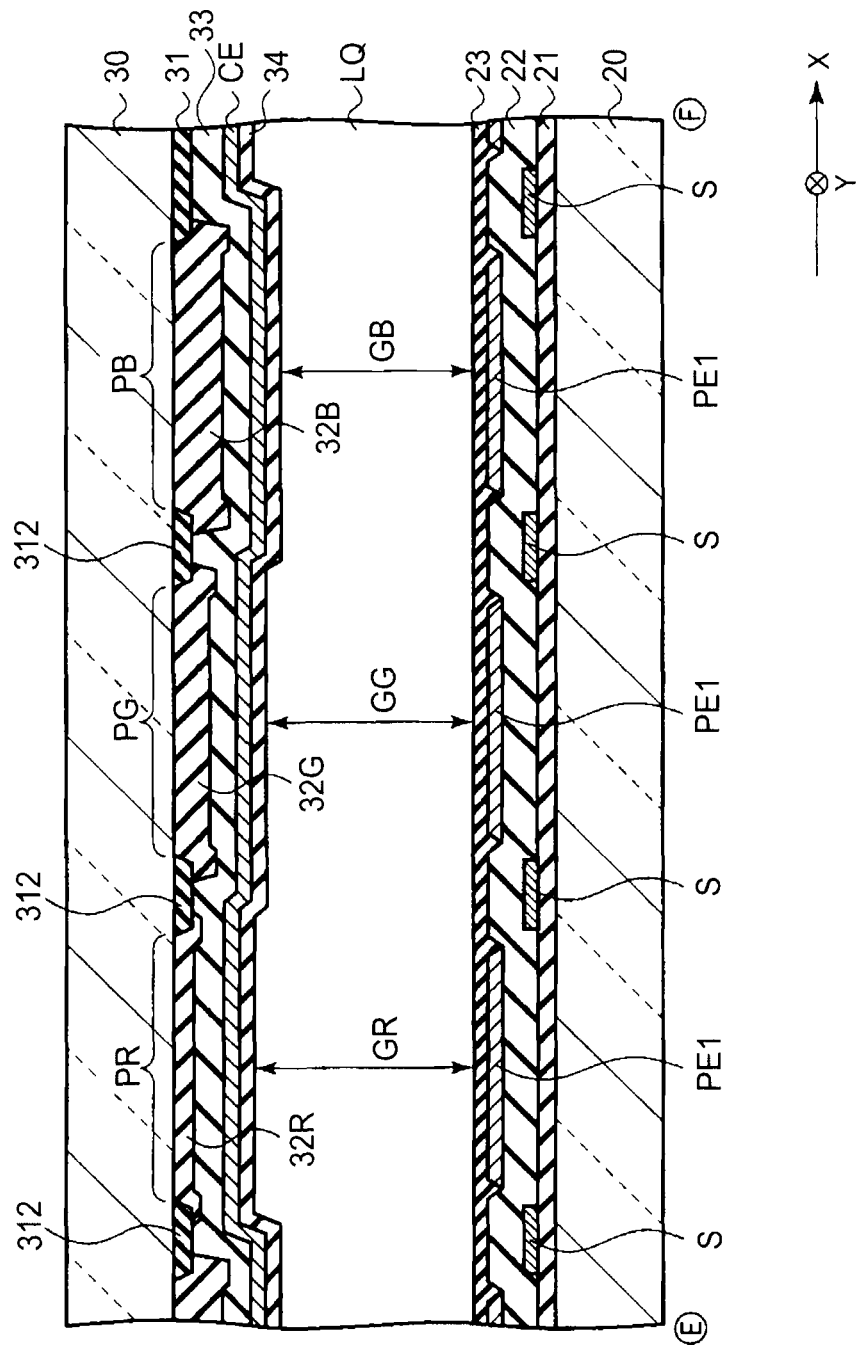

FIG. 7 is a cross-sectional figure schematically showing the liquid crystal display panel LPN taken along line E-F in the active area ACT shown in FIG. 4 according to other embodiment. In the liquid crystal display device in the OCB mode, as explained-above, the control of the retardation in the liquid crystal layer LQ is very important. Since the retardation has a wavelength dependency, the optimal retardation differs among pixels of the red pixel in which the red color filter layer 32R is arranged, the green pixel in which the green color filter layer 32G is arranged, and the blue pixel in which the blue color filter layer 32B is arranged. Thus, corresponding to the optimal retardation difference for every color pixel, a multi-gap structure is employable in this embodiment.

The openings PR, PG, and PB are respectively formed between the adjacent second belt-like portions 312 of the shield layer 31 located right above each source line S. Each of the openings PR, PG, and PB opposes the first pixel electrode PE1. In the opening PR, the red color filter layer 32R is arranged. The red color filter layer 32R is formed in the inside surface 30A of the second insulating substrate 30, and a portion of the red color filter layer 32R overlaps with the second belt-like portion 312. Similarly, the green color filter layer 32G is arranged in the opening PG, and the blue color filter layer 32B is arranged in the opening PB.

The film thickness of the red color filter layer 32R from the inside surface 30A is thinner than the film thickness of the green color filter layer 32G and the film thickness of the blue color filter layer 32B from the inside surface 30A. Moreover, the film thickness of the green color filter layer 32G from the inside surface 30A is thinner than the film thickness of the blue color filter layer 32B from the inside surface 30A.

Thereby, the relation among the cell gap GR of the liquid crystal layer LQ between the first pixel electrode PE1 and the red color filter layer 32R, the cell gap GG of the liquid crystal layer LQ between the first pixel electrode PE1 and the green color filter layer 32G, and the cell gap GB of the liquid crystal layer LQ between the first pixel electrode PE1 and the blue color filter layer 32B is as follows.

GR>GG>GB

By adopting above multi-gap structure, the retardation can be optimized in each color pixel, and it becomes possible to obtain a good display quality.

Since, especially the luminosity of the green pixel contributes to whole display luminosity greatly than the luminosity of the red pixel and the blue pixel, it is required that the cell gap GG be set to a predetermined value so as to optimize the retardation of the green pixel arranged in the active area ACT. Therefore, as explained with reference to FIG. 5, etc., the first pillar-shaped spacer SP1 is supported by the first seat layer PD1 including the green color filter layer 32G controlled so as to have the predetermined film thickness, and the desired cell gap GG is formed.

On the other hand, the second pillar-shaped spacer SP2 is supported by the second seat layer PD2 including the dummy color filter layer 32D formed using the same process and the same material as the green color filter layer 32G. Therefore, the cell gap substantially the same as the cell gap GG of the active area ACT is formed in the dummy pixel PD. Therefore, it becomes possible to form the desired cell gap GG even in the green pixel in the circumference portion of the active area ACT close to the shied area SLD. Accordingly, the luminosity of the whole area of the active area ACT can be raised, and a high quality liquid crystal display device in the OCB mode can be offered.

In the above embodiment, although the dummy color filter layer 32D shown in FIG. 4 is formed in the shape of a straight line extending in the first direction X, the dummy color filter layer 32D may be formed in the shape of a straight line extending in the second direction Y.

In the above embodiments, though the OCB mode is used to drive the liquid crystal molecules, other modes can be used.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:
1. A liquid crystal display device, comprising:
a first substrate including a first pixel electrode and a first pillar-shaped spacer arranged in an active area, and a second pixel electrode and a second pillar-shaped spacer arranged in a shield area surrounding the active area;
a second substrate including;
a shield layer formed in the shape of a belt crossing above the first pillar-shaped spacer in the active area and extending to the shield area including a portion above the second pillar-shaped spacer,
a first color filter layer crossing with the shield layer above the first pillar-shaped spacer,
a second color filter layer formed in the shape of a belt formed on the shield layer above the second pillar-shaped spacer, an overcoat layer extending in the active area including a portion above the first pillar-shaped spacer and in the shield layer including a portion above the second pillar-shaped spacer, and a counter electrode formed on the overcoat layer and facing the first and second pixel electrodes, a liquid crystal layer held between the first and second substrates, wherein the height of a first seat layer formed above the first pillar-shaped spacer and including the shield layer, the first color filter layer and the overcoat layer is substantially the same as that of a second seat layer formed above the second pillar-shaped spacer and including the shield layer, the second color filter layer and the overcoat layer.

2. The liquid crystal display device according to claim 1, wherein the film thickness of the first color filter layer arranged on the shield layer and forming the first seat layer is smaller than that of the second color filter layer arranged on the shield layer and forming the second seat layer, and the film thickness of the overcoat layer arranged on the first color filter layer and forming the first seat layer is thicker than that of the overcoat layer arranged on the second color filter layer and forming the second seat layer.

3. The liquid crystal display device according to claim 1, wherein the width of the shield layer which intersects with the first color filter layer is larger than that of the second color filter layer.

4. The liquid crystal display device according to claim 1, wherein the first and second color filter layers are formed of green color filter layers.

5. The liquid crystal display device according to claim 1, wherein the first color filter layer is formed of a green color filter layer, and the liquid crystal display device further comprises a third color filter layer of red color having a smaller thickness than the first color filter layer and a fourth color filter layer of blue color having a larger thickness than the first color filter layer.

6. The liquid crystal display device according to claim 1, wherein the liquid crystal layer is driven by an OCB mode.

7. The liquid crystal display device according to claim 1, wherein the shield area is formed of a plurality of dummy color pixels.

8. The liquid crystal display device according to claim 1, wherein the first and second pillar-shaped spacers are formed on the first and second pixel electrodes on the first substrate, respectively, a first alignment film covers the first and second pixel electrodes and the first and second pillar-shaped spacers, a counter electrode and a second alignment film cover the overcoat layer, and a gap between the first and second substrates formed by the first pillar-shaped spacer and the first seat layer is substantially the same as that formed by the second pillar-shaped spacer and the second seat layer.

9. The liquid crystal display device according to claim 3, wherein a leveling of the overcoat layer above the first and second pillar-shaped spacers is carried out corresponding to the respective widths of the shield layer crossing with the first color filter layer and the second color filter layer.

10. A liquid crystal display device, comprising:

a first substrate including a first pixel electrode and a first pillar-shaped spacer arranged in an active area, and a second pixel electrode and a second pillar-shaped spacer arranged in a shield area surrounding the active area;

a second substrate including;

a shield layer formed in the shape of a belt crossing above the first pillar-shaped spacer in the active area and extending to the shield area including a portion above the second pillar-shaped spacer, a first color filter layer formed of a green color filter crossing with the shield layer above the first pillar-shaped spacer, a second color filter layer formed of the green color filter in the shape of a belt formed on the shield layer above the second pillar-shaped spacer, a third color filter layer formed of a red color filter layer thinner than the first color filter layer, a fourth color filter layer formed of a blue color filter layer thicker than the first color filter layer, an overcoat layer extending in the active area including a portion above the first pillar-shaped spacer and in the shield layer including a portion above the second pillar-shaped spacer, and a counter electrode formed on the overcoat layer and facing the first and second pixel electrodes, a liquid crystal layer held between the first and second substrates and driven by an OCB mode;

wherein the height of a first seat layer formed above the first pillar-shaped spacer and including the shield layer, the first color filter layer and the overcoat layer is substantially the same as that of a second seat layer formed above the second pillar-shaped spacer and including the shield layer, the second color filter layer and the overcoat layer.

11. The liquid crystal display device according to claim 10, wherein the difference among the respective film thicknesses of the first, third, and fourth color filter layers form a multi-gap structure between the first and second substrates corresponding to the respective color pixels.

12. The liquid crystal display device according to claim 10, wherein the first and second pillar-shaped spacers are formed on the first and second electrodes on the first substrate, respectively, a first alignment film covers the first and second pixel electrodes and the first and second pillar-shaped spacers, a counter electrode and a second alignment film cover the overcoat layer, and a gap between the first and second substrates formed by the first pillar-shaped spacer and the first seat layer is substantially the same as that formed by the second pillar-shaped spacer and the second seat layer.

13. The liquid crystal display device according to claim 10, wherein the film thickness of the first color filter layer arranged on the shield layer and forming the first seat layer is smaller than that of the second color filter layer arranged on the shield layer and forming the second seat layer, and the film thickness of the overcoat layer arranged on the first color filter layer and forming the first seat layer is thicker than that of the overcoat layer on the second color filter layer and forming the second seat layer.

14. The liquid crystal display device according to claim 10, wherein the width of the shield layer which intersects with the first color filter layer is larger than that of the second color filter layer.

15. The liquid crystal display device according to claim 10, wherein the shield layer is formed of a plurality of dummy color pixels which does not contribute to a display.

16. The liquid crystal display device according to claim 14, wherein a leveling of the overcoat layers above the first and second pillar-shaped spacers is carried out corresponding to the respective widths of the shield layer crossing with the first color filter layer and the second color filter layer.

* * * * *